United States Patent
Sandig et al.

[11] Patent Number: 5,737,610
[45] Date of Patent: Apr. 7, 1998

[54] SYSTEM AND METHOD FOR PROVIDING DATA AND PROGRAM CODE TO A CARD FOR USE BY A READER

[75] Inventors: Bruce Darryl Sandig, Phoenix; John Edward Matlock; Roy David Pringle, both of Glendale, all of Ariz.

[73] Assignee: Infopak Inc., Phoenix, Ariz.

[21] Appl. No.: 542,041

[22] Filed: Oct. 12, 1995

Related U.S. Application Data

[63] Continuation of Ser. No. 17,607, Feb. 16, 1993, abandoned.

[51] Int. Cl.$^6$ ............................ G06F 3/06; G06K 19/07
[52] U.S. Cl. ...................... 395/712; 395/442; 235/375
[58] Field of Search ............................ 395/241, 712, 395/201, 442, 375

[56] References Cited

U.S. PATENT DOCUMENTS

| | | | |
|---|---|---|---|
| 4,607,347 | 8/1986 | Kummer et al. | 395/800 |
| 4,960,982 | 10/1990 | Takahira | 235/382 |
| 5,036,461 | 7/1991 | Elliot et al. | 395/241 |
| 5,038,025 | 8/1991 | Kodela | 235/492 |
| 5,126,541 | 6/1992 | Shinagawa | 235/438 |
| 5,168,151 | 12/1992 | Nara | 235/492 |
| 5,212,369 | 5/1993 | Karlisch et al. | 235/380 |
| 5,276,903 | 1/1994 | Shinagawa | 395/800 |
| 5,339,239 | 8/1994 | Manabe et al. | 395/201 |
| 5,375,037 | 12/1994 | Le Roux | 361/684 |
| 5,379,344 | 1/1995 | Larsson et al. | 380/23 |
| 5,422,855 | 6/1995 | Eslick et al. | 365/226 |
| 5,457,643 | 10/1995 | Vahey et al. | 364/708.1 |

OTHER PUBLICATIONS

Rosebrugh, C. and Kwang, E. "Multiple Microcontrollers In al Embedded System", Dr. Dobbs Journal, pp. 48 (6), Jan. 1992.

Kwang, E. and Rosebrugh, C. "Linking User Interface and Database Objects", Dr. Dobbs Journal pp. 44 (6), Dec. 1991.

Gallant, J. "Single-chip PC Adds Value to Personal Electronic Products", EDN vol. 37 No. 23 pp. S191 (1), Nov. 1992.

Balch, K. "It's in the Cards", Varbusiness, No. 815, pp. 86, Oct. 1992.

Primary Examiner—Thomas G. Black
Assistant Examiner—Jack M. Choules
Attorney, Agent, or Firm—Infopak Inc.

[57] ABSTRACT

A system and method for storing data and program code on an external card has been provided. Information is stored on the external card by first transferring data from a source database to a first computer (a server). The data is then transferred from the first computer to at least one additional computer (a loader). The additional computer is then utilized to i) load data on the external card, and to ii) load program code on the external card. Further, an external reader is provided for accepting the external card. The external reader includes circuitry therein which is controlled by the program code on the external card for accessing the data on the external card.

7 Claims, 4 Drawing Sheets

SYSTEM AND METHOD FOR PROVIDING DATA AND PROGRAM CODE TO A CARD FOR USE BY A READER

REFERENCES TO CROSS RELATED APPLICATIONS

This application is a continuation of U.S. patent application having Ser. No. 08/017,607 and filing date of Feb. 16, 1993, now abandoned.

This application is related to U.S. patent application having Ser. No. 07/696,948 and a filing date of May 8, 1991, now abandoned, and to U.S. patent application entitled "CIRCUIT AND DEVICE UTILIZING EXTERNAL CARDS HAVING PROGRAM CODE AND DATA STORED THEREON" having Ser. No. 08/018,326 and a filing date of Feb. 16, 1993 now abandoned.

FIELD OF THE INVENTION

This invention relates to data transfer systems and, in particular, to a system and method for transferring data and program code to an external card for use by an external device.

BACKGROUND OF THE INVENTION

There currently exists methods for transferring data from a hard disk to an external read-only memory (ROM) card such as a mask ROM card or to a flash ROM card. The data written to the card may then be utilized by an external reader to provide necessary data for use by the reader.

However, the external card typically includes only data for use by the external reader wherein the external reader typically includes memory such as a ROM chip that includes an operating program to control the operation of the external reader. In other words, the external card includes only data for use by the external reader and not program code. This has the disadvantage that any time the operating program of the external reader needs to be updated or varied, the memory in the external reader must be changed or re-programmed. Moreover, access to this memory may be difficult and time consuming especially if the memory is contained within a casing or housing.

Hence, there exists a need to provide an improved system and method for transferring both data and program code to an external card for use by an external device.

DETAILED DESCRIPTION OF THE DRAWINGS

Figure 1:
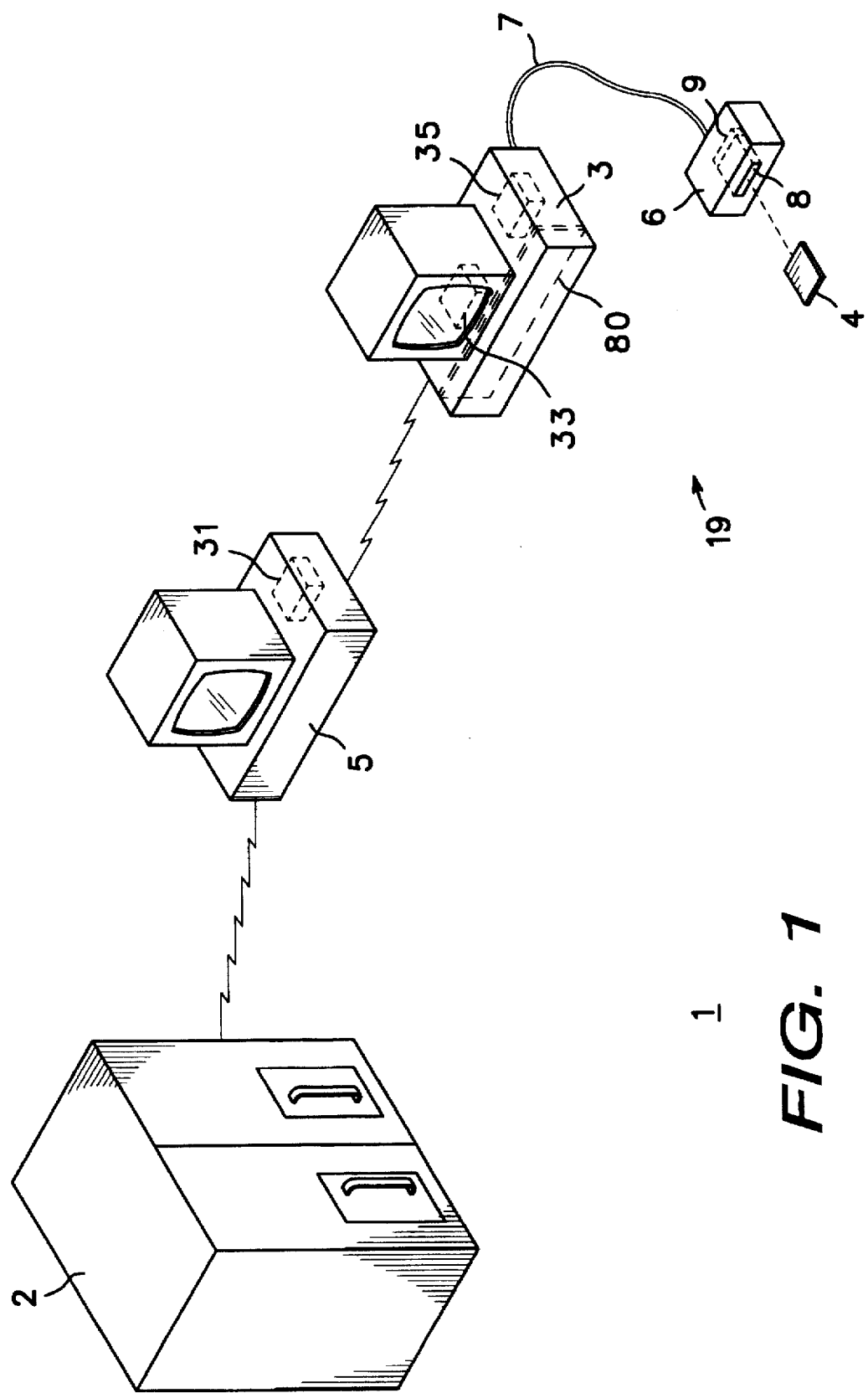
FIG. 1 is a detailed block diagram illustrating a system and method for transferring data and program code to an external card.

Referring to FIG. 1, there is illustrated system 1 for transferring data from source database 2 and program code from computer 3 to external card 4 wherein external card 4 may be, for example, a flash ROM card or a mask ROM card. The system also includes computer 5 which is coupled to source database 2, for example, via a modem. Computer 5 is also coupled to computer 3, for example, via a modem.

System 1 further includes external drive/loader 6 which is coupled to computer 3 via cable 7. Loader 6 also includes slot 8 having pin connector 9 located therein. Slot 8 of loader 6 is designed so as to allow external card 4 to be inserted therein for connection with pin connector 9. Computer 3 and loader 6 as well as cable 7 comprise loader kit 19 for loading data and program code onto external card 4.

In particular, computer 5 serves as an interface between source database 2 and loader kit 19 wherein computer 5, in a well known manner, accesses various databases from source database 2 via a modem and stores such data on storage device 31, for example, a hard drive of computer 5. Source database 2 may include, for example, data from a multiple listing source (MLS) database for real estate or telephone directory data.

Computer 5 also accesses computer 3 via a modem to transmit and store data received from storage device 31 of computer 5 to storage device 33, for example, a hard drive of computer 5. Computer 5 essentially functions as an intermediate computer between source database 2 and computer 3 to reduce the access load on source database 2. Moreover, it is understood that computer 5 not only accesses and serves computer 3 but it typically also serves a plurality of computers (not shown) which are similar to computer 3 and which may be utilized to load program code and data onto an external card similar to external card 4. In this respect, computer 5 may be referred to as a server computer for serving computer 3 (loader) as well as other computers (not shown) which are similar to computer 3.

Computer 3 subsequently transfers, in a well known manner, the data on storage device 33, via cable 7, to an external drive as designated by loader 6 which is used for writing the data onto external card 4. Further, computer 3 also includes program code stored on storage device 35, for example, a hard drive of computer 3, wherein this program code is also written to external card 4 via loader 6. The program code stored on storage device 35 typically originates from computer 5 wherein further transmissions of the program code from computer 5 to computer 3 typically occur only when the program code has been enhanced/modified thereby saving transmission time over the modem. Also, although storage devices 31, 33 and 35 are mentioned as being hard drives, it is understood that such storage devices may actually take the form of a RAM or a floppy disk.

Figure 3:
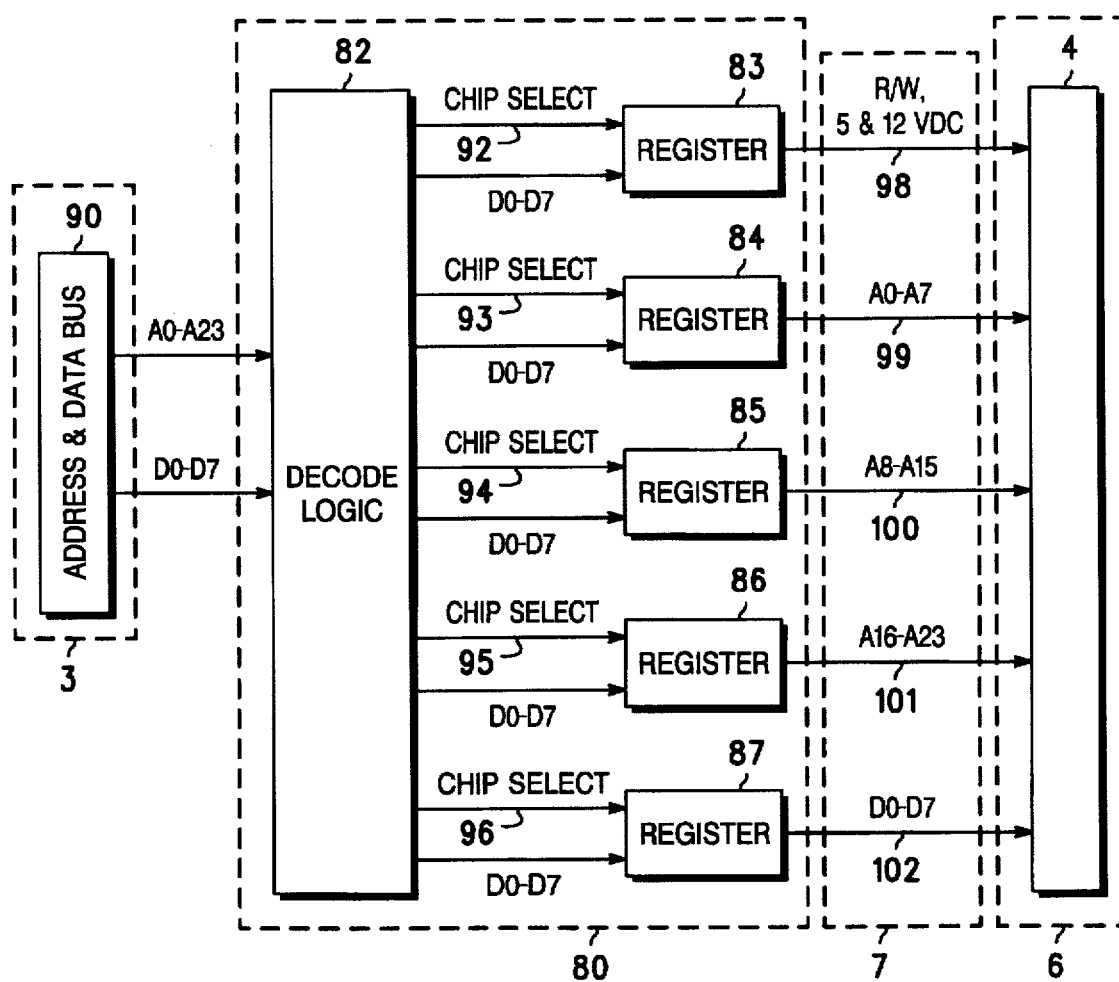
FIG. 3 is a detailed block diagram of an internal board that is used in a computer shown in FIG. 1.

Computer 3 as well as computer 5 may be typical personal computers (PC's). For example, computer 3 may be an IBM XT or AT or compatible computer, while computer 5 may be an IBM AT or compatible computer. Moreover, computer 3 requires board 80 for reading and writing data to external card 4 wherein board 80, which is shown in more detail in FIG. 3, is discussed in detail hereinafter.

Thus, the present invention provides a system and method for accessing a source database that includes data that is to be stored on an external card. Moreover, the present invention writes to the external card a predetermined program code for use with the data that is received from source database 2. Thus, it must be understood that external card 4 includes both data as well as program code. As a result, the data and program code stored on external card 4 may be modified by simply utilizing computer 3 to re-write information onto external card 4 via loader 6.

Figure 2:
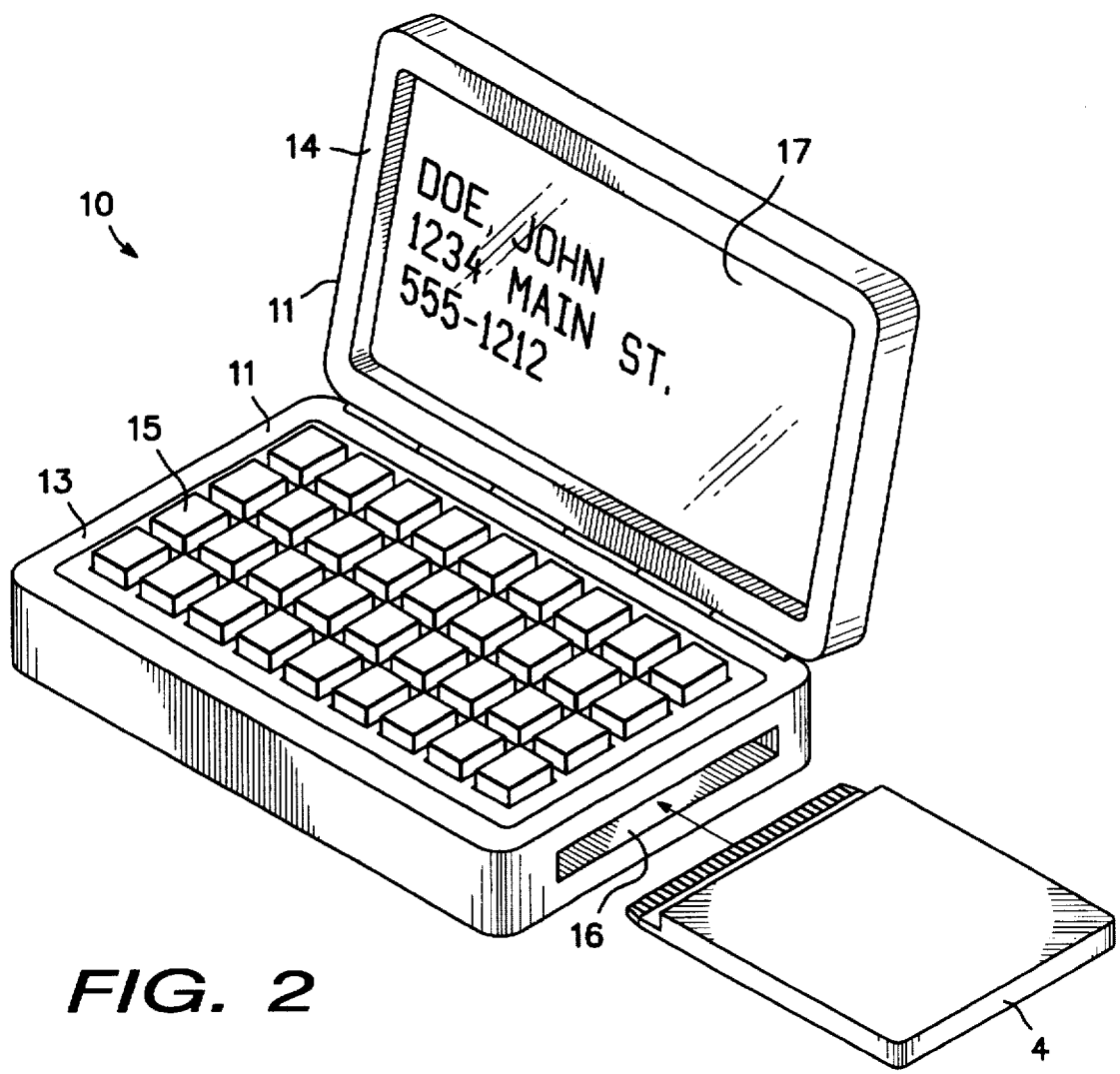
FIG. 2 is an isometric view showing an external device that utilizes the external card.

Referring to FIG. 2, a detailed isometric view of external device/reader 10 having slot/opening 16 for inserting external card 4 therein is shown. External reader 10 is said to be external because it is not shown as part of system 1 (shown in FIG. 1) which loaded data and program code onto external card 4. However, it is understood that external reader 10 and external card 4 as well as system 1 may all be viewed as one overall system for accessing data originating from a source database wherein program code as well as the data from the source database are written onto external card 4 for use by external reader 10.

External reader 10 includes hinged case 11 which comprises main housing 13 and hinged cover 14. Housing 13 includes keyboard 15 and a card receptacle or socket which is accessible via slot/opening 16 in one end of housing 13. Housing 13 also includes internal electronic circuitry shown in FIGS. 4 and 5 the operation of which will be described in detail hereinafter.

Hinged cover 14 includes liquid crystal display (LCD) 17 which is mounted on hinged cover 14.

Figure 4:
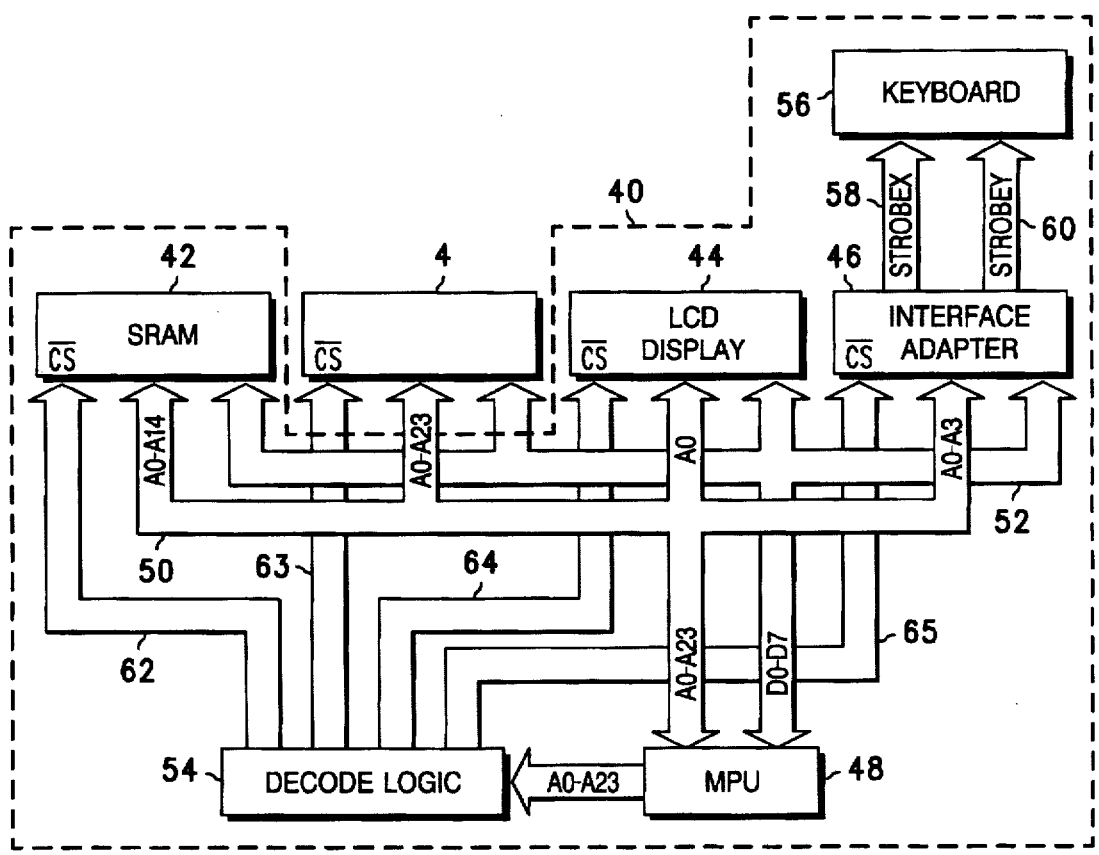
FIG. 4 is a detailed block diagram illustrating a first embodiment of a circuit for use in the external device shown in FIG. 2.
Figure 5:
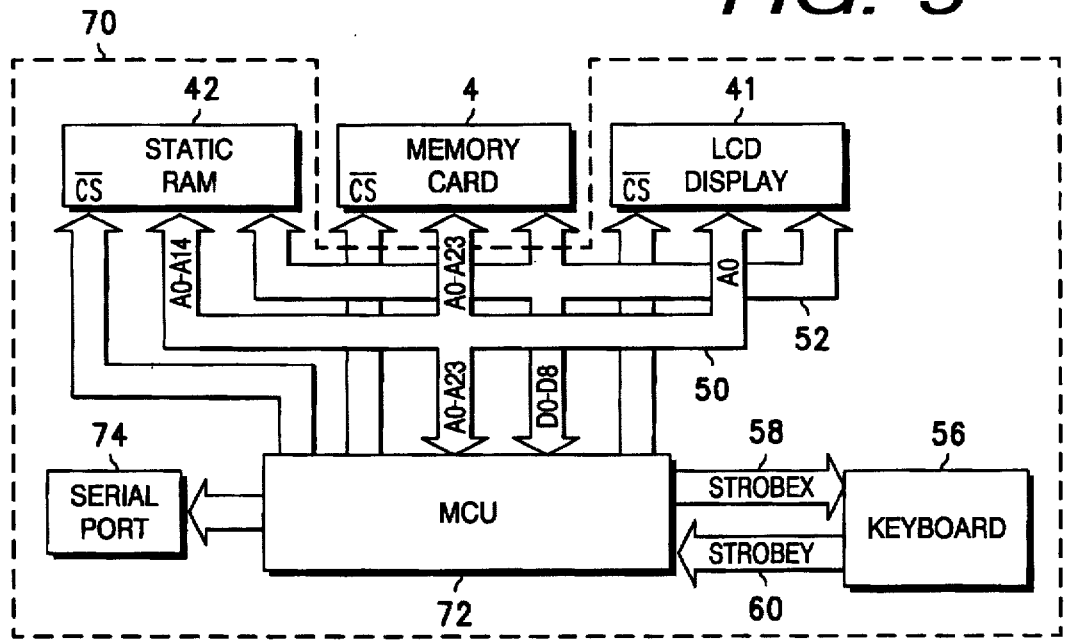
FIG. 5 is a detailed block diagram of a second embodiment of a circuit for use in the external device shown in FIG. 2.

External reader 10 is a convenient hand held device that electronically accesses and reads the information stored on card 4 by way of the internal electronic circuitry (shown in FIGS. 4 and 5). In addition, external reader 10 is a solid state device which is typically battery operated and functions as an electronic display device that essentially can fit into your pocket. Keyboard 15 is a standard alpha-numeric keyboard including 10 key numerics, 4 directional keys and 6 math function keys. Keyboard 15 may also include special keys for extended functions.

As aforementioned, both data and program code are stored on external card 4 which is inserted through slot 16 into external reader 10. Thus, it is important to realize that external reader 10 does not contain an internal program or data records of any kind. All programming code and data records are stored on external card 4. Therefore, external reader 10 may be referred to as a "dumb terminal" since it includes only a small amount of static RAM and essentially relies completely on external card 4 for operation. In this respect, external reader 10 has the distinct advantage to be able to completely alter its function by simply utilizing a different external card (or re-programming external card 4) that contains different program code and data than external card 4. Moreover, this can be accomplished without disturbing the internal circuitry of external reader 10.

Referring to FIG. 3, a detailed block diagram of internal board 80 that is inserted inside computer 3 of FIG. 1 is shown. It is understood that components shown in FIG. 3 that are similar to components shown in FIG. 1 are identified by the same reference number. Board 80 serves as a necessary interface between computer 3 and external card 4 thereby allowing information (such as data from storage device 33 and program code from storage device 35) of computer 3 to be written onto external card 4.

Board 80 includes decode logic 82 and registers 83-87. In particular, board 80 is inserted into a typical card slot of computer 3 thereby coupling decode logic 82 to computer 3's address and data bus 90. In other words, decode logic 82 has a plurality of inputs coupled to the address and data bus of computer 3 thereby receiving address bits A0-A23 and data bits D0-D7.

Because a common set of address lines are utilized to access registers 83-87, decode logic 82 is utilized in a well known manner to map the locations of each of these registers in a predetermined memory location. Thus, decode logic 82 is a common logic block which is responsive to address bits A0-A23 for providing chip select signals 92-96 respectively to registers 83-87 for decoding which chip is desired to be accessed. Decode logic 82 also provides data bits D0-D7 to registers 83-87.

In particular, register 83 is an N-bit, for example, 8-bit, control register for receiving data bits D0-D7 from the data bus of computer 3 when enabled via chip select signal 92. Register 83 also has outputs for providing a plurality of logic bits (N) to external card 4 via lines 98 for controlling whether it is desired to read or write to external card 4. For example, if it is desired to read data from external card 4, then lines 98 may be utilized to activate a 5 volt power supply. On the other hand, if it is desired to write data to external card 4, then lines 98 may be utilized to activate a 12 volt power supply.

Register 84 is an N-bit address register for receiving data bits D0-D7 when enabled via chip select signal 93. Moreover, register 84 includes a plurality of outputs for providing address bits A0-A7 to external card 4 via lines 99.

Similarly, address registers 85 and 86 are 8-bit registers for receiving data bits D0-D7 when enabled via chip select signals 94 and 95, respectively. Moreover, registers 85 and 86 include a plurality of outputs for respectively providing address bits A8-A15 and A16-A23 to external card 4 via lines 100 and 101.

Finally, data register 87 is an 8-bit register for receiving data bits D0-D7 when enabled via chip select signal 96. Moreover, register 87 includes a plurality of outputs for providing data bits D0-D7 to external card 4 via lines 102.

Registers 84-86 are respectively low, mid and high address registers for providing address bits A0-A23 to external card 4 via the concatenation of lines 99, 100 and 101. Moreover, register 87 provides data bits D0-D7 to external card 4.

Moreover it is understood that lines 98-102 are included in cable 7 shown in FIG. 1. Also, it is understood that external card 4 is typically inserted in loader 6 (shown in FIG. 1) and it is thereby coupled to cable 7 via connector 9.

Referring to FIG. 4, a detailed block diagram illustrating circuitry 40 that resides within external reader 10 for use with external card 4 is shown. Circuitry 40 includes Micro Processor Unit (MPU) 48 which is coupled to Static Random-Access Memory (SRAM) 42, external card 4, liquid crystal display (LCD display) 44 and interface adapter 46 by way of both address bus 50 and data bus 52.

In particular, MPU 48 includes 24 address bits (A0-A23) and 8 data bits (D0-D7) wherein address bits A0-A14 are coupled to SRAM 42, address bits A0-A23 are coupled to external card 4, address bit A0 is coupled to LCD display 44, and address bits A0-A3 are coupled to interface adapter 46.

Because a common set of address lines are utilized to access SRAM 42, external card 4, liquid crystal display 44 and interface adapter 46, decode logic 54 is utilized in a well known manner to map the locations of each of these devices in the total address area covered by the 24 address lines of bus 50. Thus, decode logic 54 is a common logic block which is responsive to address bits A0-A23 for providing chip select control signals 62-65 respectively to SRAM 42, external card 4, LCD display 44 and interface adapter 46 for decoding which chip is desired to be accessed. As an example of a possible memory mapping, the addresses of SRAM 42 may be mapped into the memory location of 0 to just under 32 Kbytes (kilobytes). Then there may exist approximately 32 bytes for I/O including the addresses of interface adapter 46, LCD display 44 and keyboard 56. Then, an area from 32 Kbytes to 64 Kbytes may include the location of the program code that is stored on external card 4. Finally, the addresses existing from 64 Kbytes on up to 16 megabytes ($2^{24}$) is reserved for the block of data which originated from source database 2 and is stored on external card 4. The above example shows addresses extending up to 16 megabytes, but it is understood that the addresses may extend up to what current and future memory chip technology will permit provided that the number of address lines correspondingly increase.

MPU 48 may be an ordinary commercially available microprocessor such as the 65816. MPU 48 incorporates the functions of a central processing unit, including an arithmetic unit, internal registers and a control unit. The operation of MPU 48 is synchronized by means of a clock which is integral within MPU 48 as is understood.

SRAM 42 is the read/write memory for circuitry 40. Information needed to be stored only temporarily during the performance of operating cycles is stored in SRAM 42 at predetermined address locations as is understood.

External card 4 contains the program code (operating program) for circuitry 40 wherein the program code comprises a set of sequential instructions prepared to meet the operational requirements of the specific application. Moreover, external card 4 also includes the storage capacity for storing data which was originally obtained from source database 2 of FIG. 1.

Interface adapter 46 may be an input/output (I/O) versatile interface adapter (VIA) for transmitting data to and from keyboard 56 via STROBEX data lines 58 and STROBEY data lines 60. In particular, interface adapter 46 includes two 8-bit ports (registers) that are essentially used for communicating with keyboard 56.

Keyboard 56 is a well known grid pattern keyboard wherein each key is located at an intersection of one horizontal line and one vertical line. As an example, for a 64 key keyboard, there exists 8 horizontal lines and 8 vertical lines so as to map each key to a respective intersection of one horizontal line and one vertical line. Typically, MPU 48 jumps into a interrupt routine at predetermined time intervals, for example, every 16 milliseconds or so, and sends a data pattern to the horizontal lines within keyboard 56 via STROBEX data lines 58. Subsequently, MPU then reads the logic values of the vertical lines of keyboard 56 via STROBEY data lines 60.

To distinguish which key has been pressed, MPU 48 utilizes STROBEX data lines 58 to walk a logic 1 through a stream of logic 0's wherein the logic 1 corresponds to a particular horizontal line within keyboard 56. The logic values appearing on the vertical lines are then observed, via STROBEY data lines 60, for any logic 1's appearing in a typical stream of logic 0's. The idea is that if a key is pressed, a short will appear at the intersection of the respective horizontal and vertical line where the key resides on the grid. For example, if a key residing at the intersection of the second horizontal line and the sixth vertical line is pressed, then when MPU forces a logic 1 in the bit position of STOBEX data lines 58 corresponding to the second horizontal line, then a logic 1 will subsequently appear on STROBEY data lines 60 in the bit position corresponding to the sixth vertical line. This information can then be utilized, for example, via a mapping table stored on SRAM 42, to determine exactly which key has been pressed on keyboard 56. Further, storage of which key has been pressed may also be stored on SRAM 42.

It is worth noting that although keyboard 56 has been illustrated and described as a grid pattern keyboard, the present invention is not limited to use of only this type of keyboard. The present invention utilizes a grid pattern keyboard because they are inexpensive and easy to use.

In operation of external reader 10, one begins by first plugging in external card 4 into slot 16 of external reader 10 (shown in FIG. 2) and turning on external reader 10 thereby activating circuitry 40. Upon start up, MPU 48 performs a reset of circuitry 40 and then the hardware on MPU 48 directs circuitry 40 to a predetermined memory location on external card 4. The contents of this address location includes a start-up vector which points to another address which actually signifies the beginning address of the program code. At this time, circuitry 40 is operating under program control wherein the program code is stored on external card 4.

Initially, SRAM 42 is cleared and I/O ports/registers of interface adapter 46 are also cleared. The program code then writes a predetermined header to LCD display 44 to verify the proper operation of LCD display 44. It is worth noting that LCD display 44 is an asynchronous device wherein data is sent to LCD display 44 and circuitry 40 then waits until a status signal is received from LCD display 44 signifying that such data has been received. If these steps have been successfully performed, the program code is now ready to begin the actual program for the specific application for which external card 4 has been programmed for, for example, searching an MLS database.

To help illustrate the operation of circuitry 40 in conjunction with external card 4, a detailed operation is presented for the example when external card 4 incudes program code for accessing a real estate MLS database that is also stored on external card 4. After initialization, the program code stored on external card 4 functions to write an MLS main menu screen to LCD display 44 and circuitry 40 then waits for the user to select predetermined numbered items, via keyboard 56, for searching the MLS database by. For example, the MLS database may be utilized to search for real estate property based on such criteria as zip code, square footage, number of bedrooms, or price.

As aforedescribed, approximately every 16 milliseconds, MPU 48 checks to see if a valid key has been pressed (by walking a logic 1 through the bits of STROBEX data lines 58 and observing the logic state of the bits of STROBEY data lines 60). If a valid key has been pressed, MPU 48 stores a logic representation of that key in a predetermined address in SRAM 42. As an example, suppose that the user wishes to search the MLS database by square footage. The user will then type the number corresponding to square footage. This number is read in by microprocessor 48 and is stored in a predetermined location in SRAM 42.

In response to this number, the program code jumps to a square footage subroutine which starts off by first clearing LCD display 44 and then writing a square footage menu screen to LCD display 44 which essentially prompts the user for a desired minimum and maximum square foot range for searching the MLS database. The minimum and maximum square foot values are then entered by the user via keyboard 56 and are stored in predetermined address locations of SRAM 42.

Assuming that for this example a search by square footage is the only searching criteria selected by the user, the program code then jumps to a subroutine which displays, on LCD display 44, a summary screen wherein the basic format of the summary screen is stored in the program code on external card 4, while the information (data) which appears in the appropriate position on the summary screen is data that was typed in by the user an is stored in SRAM 42. The summary screen also prompts the user to either i) revise the search wherein the user may wish to change the square foot range or even search by another criteria such as price, ii) perform a search, or iii) quit.

Circuitry 40 then waits for an appropriate key to be hit via keyboard 56 to determine whether the user wants to revise, search or quit. Assuming a search is desired, the program code uses MPU 48 to compare the data stored in predetermined addresses of SRAM 42 (the square footage range for this example) with each MLS database entry that is stored in a predetermined range of addresses on external card 4.

Any entry in the MLS database that has a square footage falling within the square foot range chosen by the user is considered a match and is stored in a predetermined location in SRAM 42. The matching MLS database entry is converted into a record which not only includes the square footage of the property found but also all other MLS listed information such as address, property type, agent's name, pool, fireplace, etc.

Circuitry 40 then displays record number 1 to LCD display 44 for viewing. The user is then allowed to pan through each page of a record and also to pan through each of the records by pressing the appropriate arrow keys on keyboard 56.

Although the operation of circuitry 40 has been described by the use of an MLS database example, it is understood that circuitry 40 as well as system 1 is not intended to be limited to use for searching MLS databases. Rather, it is understood that circuitry 40 includes the necessary hardware such that external card 4 may be loaded with data and program code for performing a plurality of applications. For example, external card 4 may include data and program code for searching a telephone directory, or data and program code for searching tax files. Thus, the beauty of the present invention should be clear in that external reader 10 which includes circuitry 40 is essentially non-functional without the use of an external card (4) which has been previously loaded with program code and data by the method aforedescribed for system 1 of FIG. 1.

Referring to FIG. 5, an alternate embodiment of a detailed block diagram illustrating circuitry 70 that resides within external reader 10 for use with external card 4 is shown. It is understood that components shown in FIG. 5 that are identical to components shown in FIG. 4 are identified by the same reference numbers. In particular, Micro Controller Unit (MCU) 72 of FIG. 5 essentially incorporates the function of MCU 48, decode logic 54 and interface adapter 46, the operation of which is described above and shown in FIG. 4. In other words, circuitry 70 shown in FIG. 5 provides a higher level of integration than circuitry 40 shown in FIG. 4 wherein MCU 72 incorporates the functions of microprocessor 48, decode logic 54 and interface adapter 46. As a result, the operation of circuitry 70 is the same as the above described operation of circuitry 40 of FIG. 4.

Moreover, circuitry 70 includes serial port 74 for providing, for example, an AC adapter output.

By now it should be apparent from the foregoing discussion that a novel system and method for storing data and program code on an external card has been provided. Information is stored on the external card by first transferring data from a source database to a first computer (a server). The data is then transferred from the first computer to a second computer (a loader). The second computer is then utilized to i) load data from the second computer to the external card, and to ii) load program code from the second computer to the external card.

In addition, an external reader is provided for reading the data on the external card wherein the external reader includes circuitry therein which is controlled by the program code on the external card for accessing the data on the external card.

While the invention has been described in conjunction with specific embodiments thereof, it is evident that many alternations, modifications and variations will be apparent to those skilled in the art in light of the foregoing description. Accordingly, it is intended to embrace all such alternations, modifications and variations in the appended claims.

We claim:

1. A method for transferring data and program code to an external card and utilizing a reader controlled by the program code for accessing the data, the method comprising the steps of:

storing the program code on a first storage device of a computer;

transferring the data from a source database to a second storage device of said computer;

transferring the data and the program code to the external card; and using an external reader including circuitry controlled by the program code stored on the external card for accessing the data on the external card, said external reader having no internal program code stored therein and being incapable of accessing the data without the program code stored on said external card.

2. The method according to claim 1 further including the steps being performed before the step of transferring the data of:

transferring the data from said source database to a third storage device of an intermediate computer; and transferring the data from said third storage device of said intermediate computer to said second storage device of said computer.

3. A system for transferring a database and program code that controls access to the database to an external card, the system comprising:

a source for storing the database;

at least one computer including first and second storage devices, said at least one computer being coupled to said source for transferring the database from said source to said first storage device, said second storage device having the program code stored thereon;

an external drive being coupled to said at least one computer and to the external card, said external drive for loading the data and the program code on the external card; and an external reader for receiving the external card, said external reader including circuitry controlled by the program code stored on the external card for accessing the database stored on said external card, said external reader having no internal program code stored therein and being incapable of accessing the database without the program code stored on the external card.

4. The system according to claim 3 further including at least one intermediate computer coupled between said source and said at least one computer, said at least one intermediate computer including a third storage device and being utilized for transferring the database from said source to said third storage device and from said third storage device to said first storage device.

5. A system for accessing, a database, the system comprising:

a source database for providing the database;

at least one computer including first and second storage devices, said at least one computer being coupled to said source database for transferring the database from said source database to said first storage device, said second storage device having program code stored thereon;

a card;

a loader coupled to said at least one computer and to said card for storing said program code and the database on said card; and a reader having means for receiving said card, said reader including internal circuitry being controlled by said program code stored on said card for reading the database stored on said card, said reader having no internal program code stored therein and being incapable of accessing the database without said program code stored on said card.

6. The system according to claim 5 further including at least on intermediate computer coupled between said source database and said at least one computer, said at least one intermediate computer including a third storage device and being utilized for transferring the database from said source database to said third storage device and from said third storage device to at least said first storage device of said at least one computer.

7. The system according to claim 5 wherein said at least one computer includes an internal board for interfacing between said at least one computer and the card, said internal board including:

decode logic being coupled to an address and a data bus of said at least one computer, said decode logic proving a plurality of select signals and a plurality of output signals; and a plurality of registers, each one of said plurality of registers having a chip select input and a plurality of inputs for receiving said plurality of output signals from said decode logic, each one of said plurality of registers having a plurality of outputs coupled to the card.

* * * * *